(12) United States Patent
Epple et al.

(10) Patent No.: US 7,077,409 B2
(45) Date of Patent: Jul. 18, 2006

(54) VEHICLE SUSPENSION

(75) Inventors: Johann Epple, Marktoberdorf (DE); Gerd Rathke, Marktoberdorf (DE); Robert Honzek, Oberthingau (DE)

(73) Assignee: AGCO GmbH (DE)

( * ) Notice: Subject to any disclaimer, the term of this patent is extended or adjusted under 35 U.S.C. 154(b) by 252 days.

(21) Appl. No.: 10/689,180

(22) Filed: Oct. 20, 2003

(65) Prior Publication Data

US 2005/0082105 A1    Apr. 21, 2005

(51) Int. Cl.
*B60G 3/12* (2006.01)

(52) U.S. Cl. .................. 280/124.128; 280/124.116; 180/358

(58) Field of Classification Search ......... 280/124.125, 280/124.128, 124.134, 124.156, 124.116; 180/348, 356, 358–359, 382, 385, 370, 352, 180/377–378, 24.04, 24.09
See application file for complete search history.

(56) References Cited

U.S. PATENT DOCUMENTS

| | | | | |
|---|---|---|---|---|
| 2,172,177 A | * | 9/1939 | Rose | 180/234 |
| 2,418,744 A | * | 4/1947 | Ballamy et al. | 180/362 |
| 2,873,980 A | * | 2/1959 | Thomas et al. | 280/124.134 |
| 3,020,968 A | | 2/1962 | Sampietro | |
| 3,081,843 A | | 3/1963 | Dotto et al. | |
| 3,952,824 A | * | 4/1976 | Matschinsky | 180/353 |
| 4,669,559 A | * | 6/1987 | Fukui | 180/6.24 |
| 4,705,128 A | * | 11/1987 | Krude | 180/348 |
| 4,717,171 A | * | 1/1988 | Kami et al. | 280/834 |
| 6,092,511 A | * | 7/2000 | Middlebrook | 123/559.1 |
| 6,193,250 B1 | * | 2/2001 | Woo | 280/124.107 |
| 6,390,486 B1 | * | 5/2002 | Boes et al. | 280/124.171 |

FOREIGN PATENT DOCUMENTS

| | | |
|---|---|---|
| EP | 0494286 | 12/1993 |
| FR | 2706369 | 6/1993 |
| FR | 2726231 | 10/1994 |
| GB | 478233 | 1/1938 |
| GB | 2115360 | 9/1983 |
| JP | 58 141907 | 8/1983 |
| WO | PCT 02/22427 | 8/2001 |

* cited by examiner

*Primary Examiner*—David R. Dunn
*Assistant Examiner*—Drew J. Brown
(74) *Attorney, Agent, or Firm*—Troutman Sanders, LLP; Gerald R. Boss, Esq.

(57) ABSTRACT

A commercial vehicle with a technically simple single wheel suspension for the wheels mounted in wheel supports, guaranteeing safe protection of the cardan shaft driving the wheels from harmful influences, includes a wheel support (8; 33), which
  a) together with a spring arm (7; 35) forms a longitudinal swinging arm (16; 21; 37) which is articulated to the gearbox (1) in front of the wheel (4) in the longitudinal direction of the vehicle,
  b) extends directly to the gearbox (2; 25; 32) and
  c) fully receives the cardan shaft (12) arranged between the output shaft (5) of the gearbox (2; 25; 32) and the assigned wheel shaft (10).

18 Claims, 6 Drawing Sheets

VEHICLE SUSPENSION

FIELD OF THE INVENTION

The invention relates to a commercial vehicle, in particular a field tractor, with a single wheel suspension for unarticulated wheels.

BACKGROUND OF THE INVENTION

Conventional field tractors with unsprung wheels no longer meet the demands for higher travel speed in road traffic, greater efficiency and economic soil conditioning in field operation whilst at the same time providing the best possible driving comfort. One precondition for achieving this is a vehicle suspension with the lowest possible unsprung mass. Field tractors with a rigid axle body between the wheels, as described in DE 201 06 172 U1 and EP 0 494 286 Bi, are poorly suited for meeting the requirements mentioned because of the high mass compared to that of the wheels. Moreover, the fact that the rear axle, uncoupled from the gearbox, is driven by a cardan shaft which departs from the vehicle gear, gives rise to a larger wheelbase which in turn results in a larger turning circle, thereby reducing the maneuverability of the vehicle. In the light of this it would appear appropriate, in the case of field tractors, to dispense with a rigid axle, at least in the rear area, and to adopt a single wheel suspension of the wheels.

Independent suspension for the wheels of field tractors is known. For example, a sprung support for the driven wheels of such vehicles is described in DE-PS 484 552: A wheel shaft departing from a universal joint in the gearbox extends through an axle housing secured to the side of the gearbox and supports a wheel at its free end. In the region of the wheel the axle housing passes into a vertical, arch-shaped guide in which a bearing, also arch-shaped and supported on the wheel joint, is guided so that the wheel shaft, with the wheel, is able to swivel about the universal shaft against the force of leaf springs in the manner of transverse swinging arm. This design is relatively complicated.

A further independent suspension for wheels of field tractors, in which a wheel support is guided by means of several transverse swinging arms, was presented by the company John Deere at AGRITECHTNICA, which was held in Hanover, Germany in November 2001. However, the three transverse swinging arms and the cardan shaft driving the wheel are fully unprotected and therefore require a high degree of maintenance.

SUMMARY OF THE INVENTION

The objective of this invention is to provide a vehicle with a technically simple independent suspension for wheels mounted on a wheel support, which suspension protects the cardan shaft driving the wheels from harmful influences, and has a low unsprung mass.

Thus, according to the present invention, there is provided a vehicle driveline and suspension arrangement. Since the length of the longitudinal extending swinging arms does not affect the length and width of the vehicle, longer swinging arms may be used and longer spring travel can therefore be achieve.

The integral design of the wheel support as part of each longitudinal swinging arm provides an arrangement having a small number of components thus simplifying maintenance.

Technically simple guidance of the swinging arms of the chassis is provided by the following arrangements. In a first arrangement, each swinging arm is guided on the chassis 1,2 by a guide 15 mounted on the chassis and a slide 14 mounted on the swinging arm. The slide 14 is slideably mounted in the guide 15 to constrain lateral movement of the swinging arm. The guide 15 is located longitudinally between the pivot axis 6 of the swinging arm 16 on the chassis and the drive shaft 12. In a second arrangement, the guide 15 is located on the opposite side of the drive shaft 12 from the swing arm pivot axis 6. In a third arrangement, each swinging arm 16 is guided against lateral movement by a transverse swinging arm 22 mounted on the chassis 1,2.

By means of such guidance it is possible to reduce the loading of the chassis considerably in the area of the pivoting of the swinging arms on the chassis, since the guide absorbs most of the lateral forces acting on the wheels.

In order to minimize torque to be transmitted by the drive shafts, and hence also the external dimensions of the drive shaft themselves, a reduction gear may be mounted in the wheel support.

The arrangement may include a wheel brake comprising a brake disc 26 and a brake saddle 27 mounted in the housing 24 which extends toward the gearbox 25, and wherein the brake saddle 27 is pivotable between active and inactive positions, the housing including a shutter 28 covering an opening in the wall of the housing and the brake being accessible through the shutter 28. Such an installation facilitates easy inspection and repair of the brake.

BRIEF DESCRIPTION OF THE DRAWINGS

The invention will now be described by way of example only, with reference to the accompanying drawings in which.

DETAILED DESCRIPTION OF THE INVENTION

Figure 1:
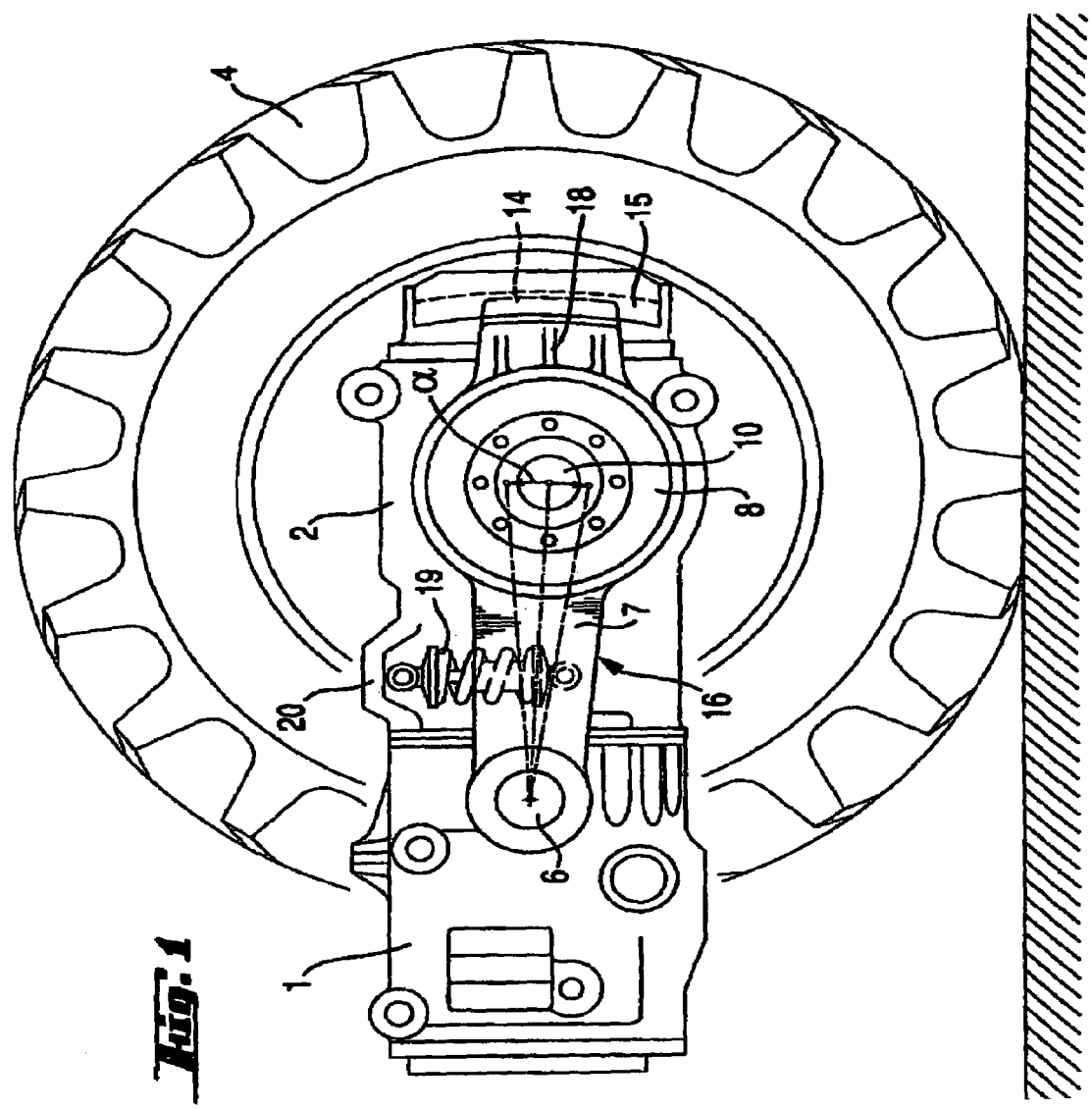
FIG. 1 is a first embodiment of a vehicle driveline and wheel suspension with a longitudinal swinging arm guided in a straight guide, in a side elevation.
Figure 2:
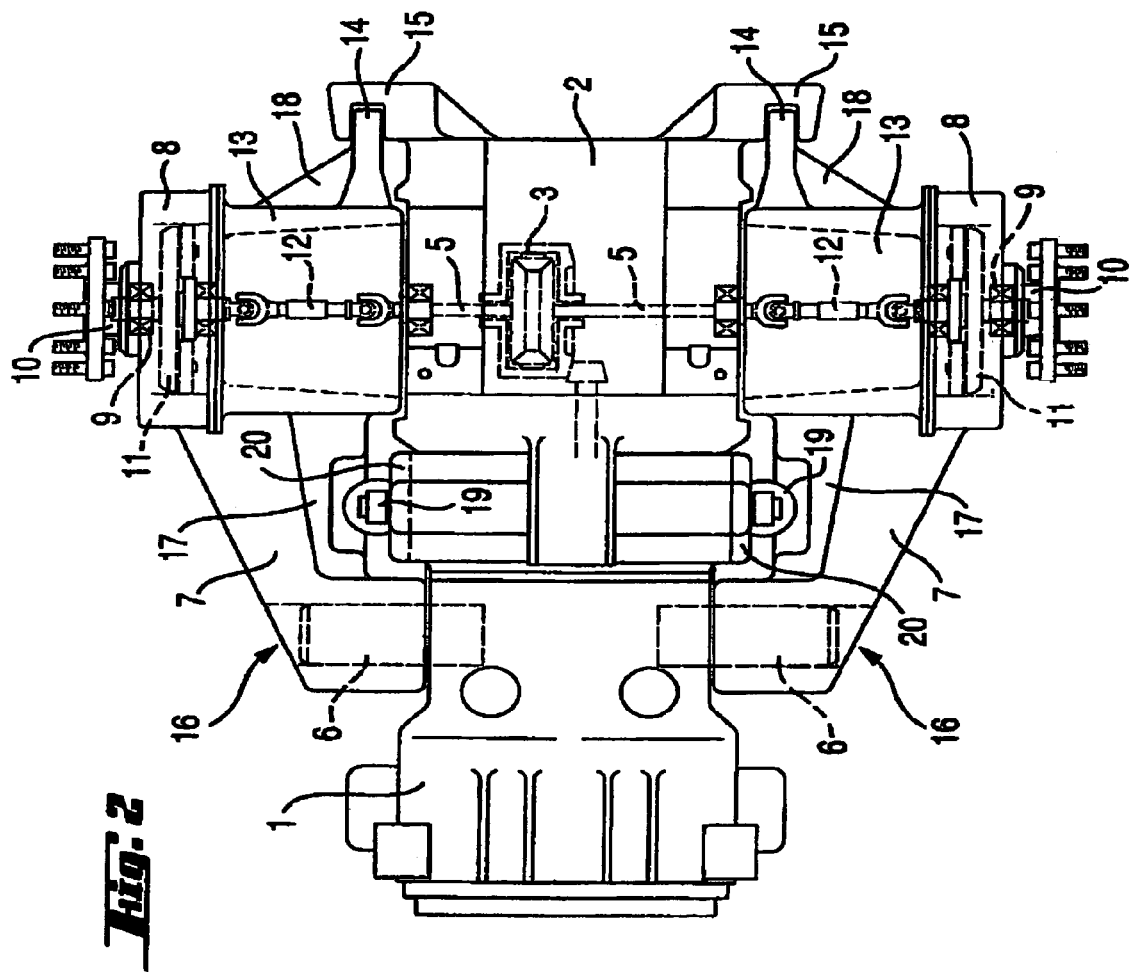
FIG. 2 is a plan view of the vehicle driveline and wheel suspension according to FIG. 1 from above.

FIGS. 1 and 2 relate to a vehicle driveline and wheel suspension for a field tractor, of which only two gearboxes 1 and 2, combined to form one unit, are shown. The front gearbox 1 contains a driving gear; a differential gear 3 is housed in the rear gearbox 2 for driving the rear unarticulated wheels 4 of the vehicle. The driven shafts 5 of differential gear 3, extend from the right and left of gearbox 2.

Each swinging arm 16, of a pair of swinging arms 16 comprises a member 7, which member mounts a wheel support towards the free end thereof, and at the other end thereof is mounted pivotally on a shaft 6 in front of driven shafts 5, in the longitudinal direction of the vehicle, a respective one swing arm of the pair being mounted on either side of the gearbox 1. The said wheel support houses not only bearings 9 for supporting wheel shaft 10, which in turn supports a wheel 4, but also a reduction gear 11, these components being of prior art and are not therefore shown in detail. A reduction gear 11 is required to reduce the relatively high speeds of driven shafts 5 to the low speeds of wheels 4 used in field tractors.

Compared to the predetermined gauge of the field tractor, the width of gearbox 2 is small. Since wheel bearings 9 are to be located as close to wheel 4 as possible, a cardan shaft 12 is used to transmit power from driven shafts 5 to reduction gear 11. The cardan shaft 12 is in two halves which can slide relative to each other in the known manner to accommodate the relative movements between shaft 5 and reduction gear 11 resulting from movements of the swinging arm 16. The arrangement of reduction gear 11 in wheel support 8 is such that the torque loading of cardan shaft 12 remains low because of its high speed and cardan shafts with small dimensions can be used.

To ensure that cardan shaft 12 is protected against undesirable environmental influences whilst the vehicle is operating, a wheel support extension housing, inside which cardan shaft 12 is securely housed, extends from wheel support 8 directly to gearbox 2. A slide 14, attached to wheel support extension housing 13 in the immediate vicinity of and parallel with gearbox 2 slides in a longitudinal guide 15 secured to gearbox 2. This relieves spring arm 7 and its shaft 6 of acting laterally on the wheels.

Webs 17, 18 provided between member 7 and wheel support extension housing 13, and between wheel support extension housing 13 and slide 14, stiffen the entire longitudinal swinging arm 16, consisting of member 7, wheel support 8, wheel support extension housing 13 and slide 14. Here web 17 serves as a support for a spring and damping element 19, which absorbs the spring excursion of longitudinal swinging arm 16, denoted by, and which is supported on a mounting surface 20 of gearbox 2.

Figure 3:
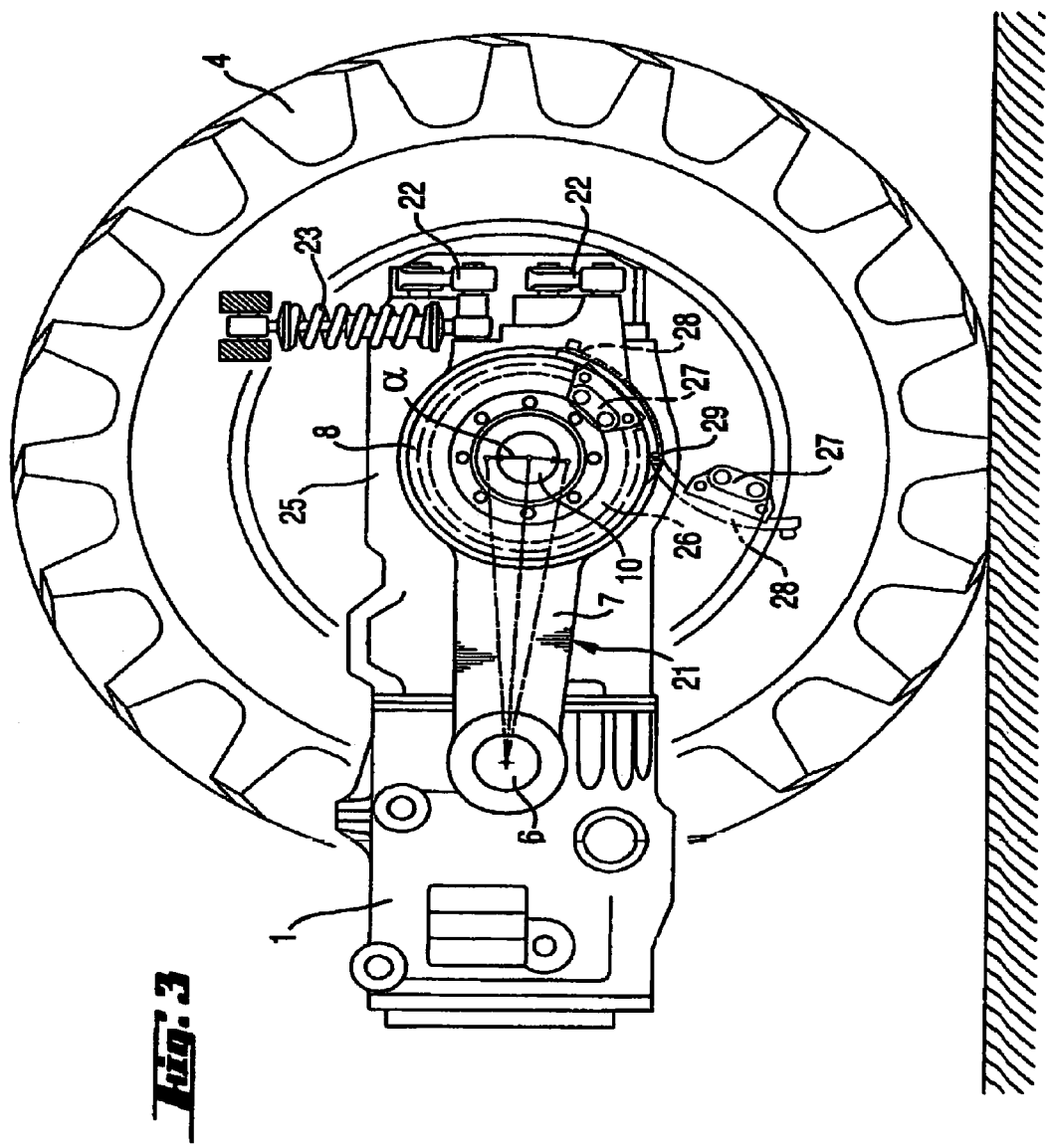
FIG. 3 is a side view of a second embodiment of a vehicle driveline and wheel suspension with a longitudinal swinging arm guided by means of transverse swinging arms.
Figure 4:
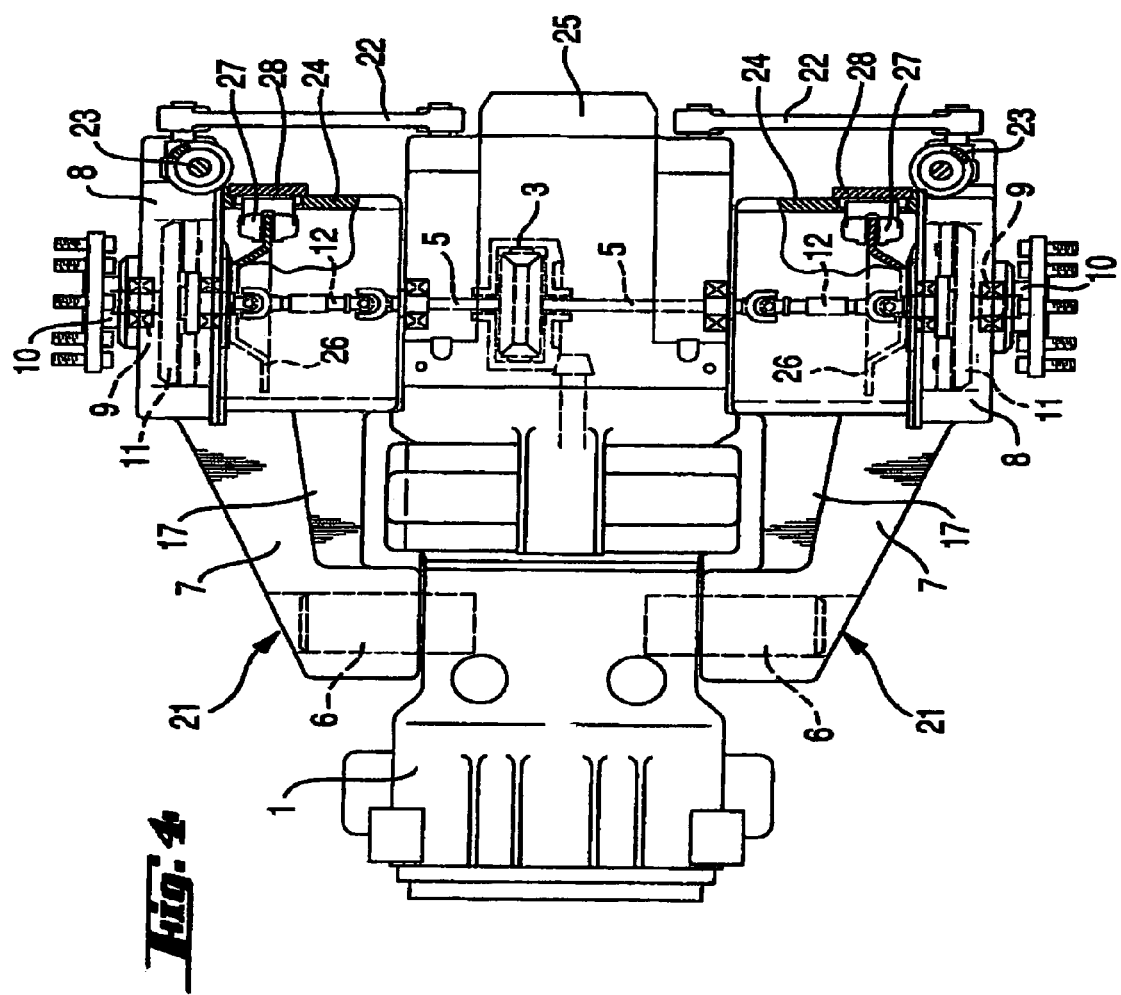
FIG. 4 is a plan view of the vehicle driveline and wheel suspension according to FIG. 3 from above.

The embodiment shown in FIGS. 3 and 4 is distinguished, in terms of the wheel suspension itself, in that instead of a straight guide for longitudinal swinging arm 21, a transverse swinging arm 22, articulated between wheel support 8 and gearbox 25, is provided. Moreover, a spring leg 23 is arranged between wheel support extension housing 24 and gearbox 25.

Furthermore, a wheel disc brake is arranged in wheel support extension housing 24, where disc brake 26 lies in the drive line between cardan shaft 12 and reduction gear 11, and brake saddle 27 projects through an opening into wheel support extension housing 24 and is secured to a shutter 28 sealing the opening. Shutter 28 is mounted on wheel support extension housing 24 by means of hinges 29, and when swivelled outwards it enables the disc brake to be easily inspected.

Figure 5:
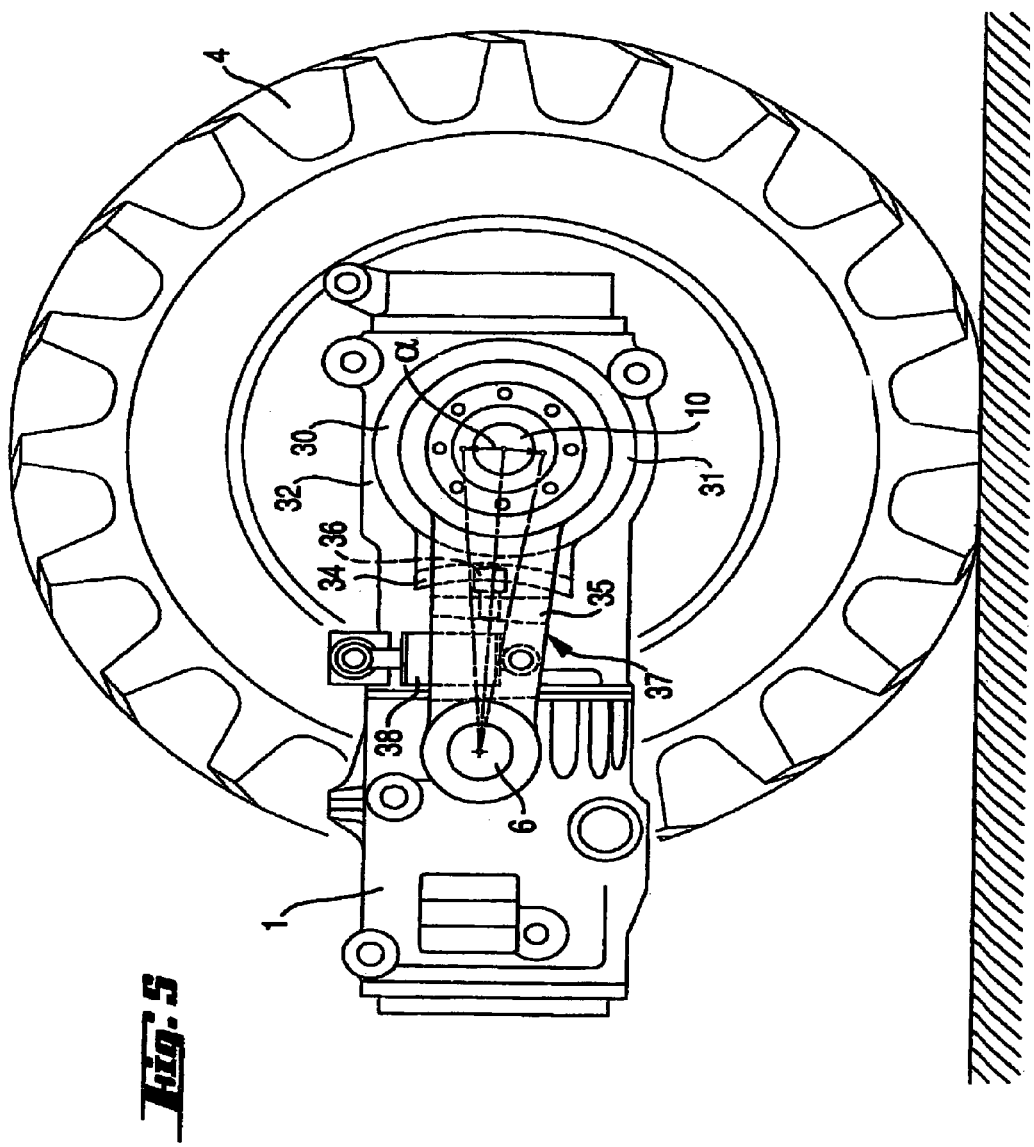
FIG. 5 is a side view of a third embodiment of a vehicle driveline and wheel suspension with at reduction gear installed in the gearbox, in contrast to the embodiments shown in FIGS. 1 to 4.
Figure 6:
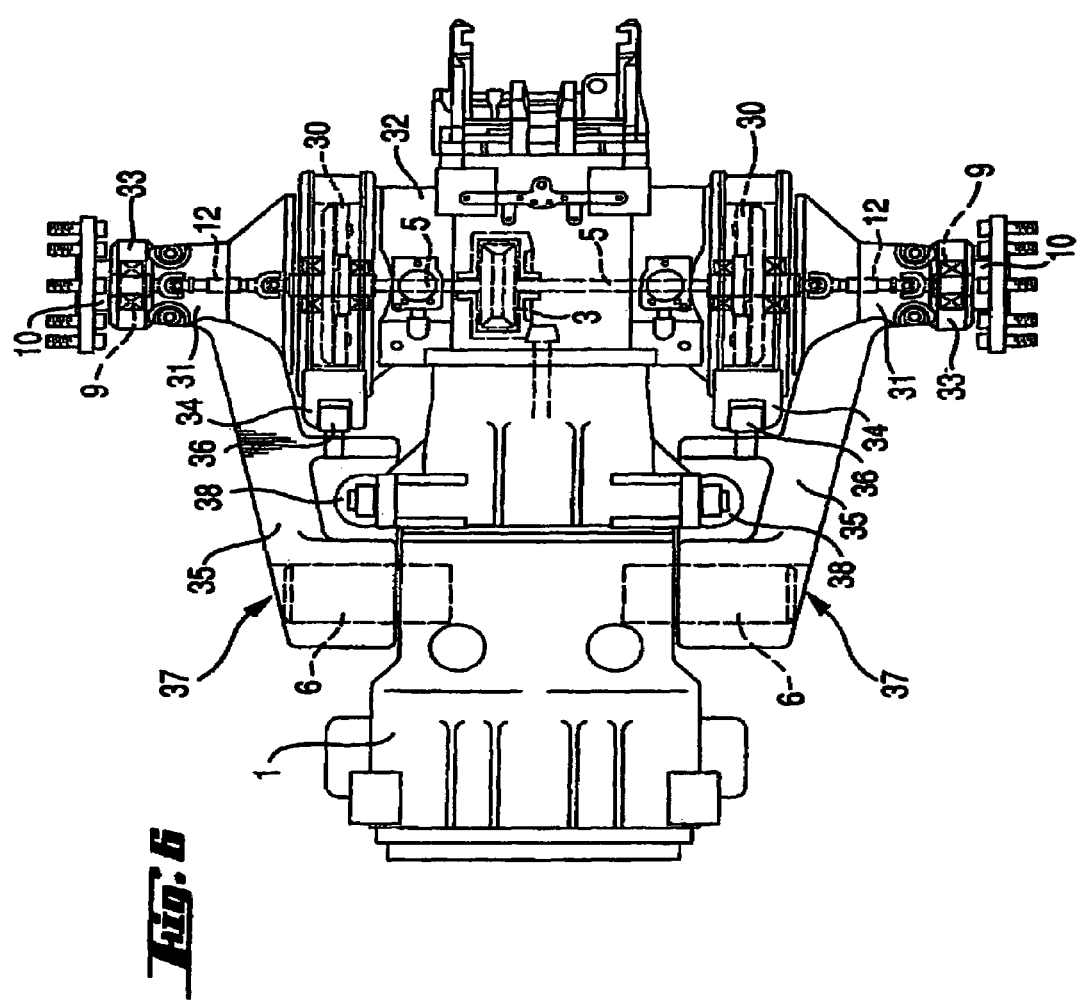
FIG. 6 is a plan view of the vehicle driveline and wheel suspension according to FIG. 5.

The embodiment shown in FIGS. 5 and 6 differs very little from the embodiments previously described in terms of the wheel suspension itself, except that reduction gear 30 is not assigned to wheel support extension housing 31 but to gearbox 32, the diameter of wheel support 33 may therefore be kept small. The part of gearbox 32 receiving reduction gear 30 is provided with a longitudinal guide 34 in which engages a slide 36 rigidly connected to member 35, thereby providing a safe guide for longitudinal swinging arm 37. Longitudinal swinging arm 37 is suspended as described in FIG. 1, by means of a spring leg 38.

The invention claimed is:

1. A vehicle driveline and suspension arrangement comprising a hollow chassis which extends longitudinally relative to the vehicle and which contains a driveline for transmitting power to a pair of wheels suspended from the chassis, each wheel being mounted on a swinging arm which is pivoted at one end on the chassis and which extends longitudinally relative to the chassis, the other end of each swinging arm carrying a wheel support and final drive for the respective wheel, a respective resilient suspension member connected at one end to the chassis and at the other end to each respective swinging arm, a drive shaft extending transversely between each final drive and a gearbox which forms part of the driveline within the chassis, each drive shaft being connected with its respective final drive and the gearbox via respective flexible couplings and each drive shaft comprising a pair of shaft halves which are slidable with respect to each other, each drive shaft being enclosed substantially along its entire length and each swinging arm being guided on the chassis against lateral movement relative to the chassis during pivoting, wherein each swinging arm is guided on the chassis by a guide mounted on the chassis and a slide mounted on the swinging arm, said slide being slidably mounted in the guide to constrain lateral movement of said swinging arm.

2. The arrangement according to claim 1, wherein the wheel support is integral with each respective swinging arm.

3. The arrangement according to claim 1, wherein each swinging arm includes a housing which encircles the respective drive shaft and extends towards the gearbox.

4. The arrangement according to claim 3, including a wheel brake comprising a brake disc and a brake saddle mounted in the swinging arm housing which extends towards the gearbox and wherein the brake saddle is pivotable between active and inactive positions, the housing including a shutter covering an opening in the wall of said housing and the brake being accessible through said shutter.

5. The arrangement according to claim 4, wherein the opening is substantially aligned with said brake saddle, and wherein, when said shutter is opened the brake saddle passes through said opening to its inactive position.

6. The arrangement according to claim 1, wherein said guide is located longitudinally between the pivot axis of the swinging arm on the chassis and the drive shaft.

7. The arrangement according to claim 1, wherein said guide is located on the opposite side of the drive shaft from the swinging arm pivot axis.

8. The arrangement according to claim 1, wherein said wheel final drive includes a reduction gear.

9. The arrangement according to claim 1, wherein a reduction gear for each wheel is mounted in the chassis.

10. A vehicle driveline and suspension arrangement comprising a hollow chassis which extends longitudinally relative to the vehicle and which contains a driveline for transmitting power to a pair of wheels suspended from the chassis, each wheel being mounted on a swinging arm which is pivoted at one end on the chassis and which extends longitudinally relative to the chassis, the other end of each swinging arm carrying a wheel support and final drive for the respective wheel, a respective resilient suspension member connected at one end to the chassis and at the other end o each respective swinging arm, a drive shaft extending transversely between each final drive and a gearbox which forms part of the driveline within the chassis, each drive shaft being connected with its respective final drive and the gearbox via respective flexible couplings and each drive shaft comprising a pair of shaft halves which are slidable with respect to each other, each drive shaft being enclosed substantially along its entire length and each swinging arm being guided on the chassis against lateral movement relative to the chassis during pivoting, wherein each swinging arm is guided against lateral movement by a transverse swinging arm mounted on the chassis.

11. The arrangement according to claim 10, wherein the wheel support is integral with each respective swinging arm.

12. The arrangement according to claim 10, wherein each swinging arm includes a housing which encircles the respective drive shaft and extends towards the gearbox.

13. The arrangement according to claim 12, including a wheel brake comprising a brake disc and a brake saddle mounted in the swinging arm housing which extends towards the gearbox and wherein the brake saddle is pivotable between active and inactive positions, the housing including a shutter covering an opening in the wall of said housing and the brake being accessible through said shutter.

14. The arrangement according to claim 13, wherein the opening is substantially aligned with said brake saddle, and wherein, when said shutter is opened the brake saddle passes through said opening to its inactive position.

15. The arrangement according to claim 10, wherein said guide is located longitudinally between the pivot axis of the swinging arm on the chassis and the drive shaft.

16. The arrangement according to claim 10, wherein said guide is located on the opposite side of the drive shaft from the swinging arm pivot axis.

17. The arrangement according to claim 10, wherein said wheel final drive includes a reduction gear.

18. The arrangement according to claim 10, wherein a reduction gear for each wheel is mounted in the chassis.

* * * * *